Aug. 11, 1953 N. L. STALLSMITH 2,648,230
ADJUSTABLE BEARING SUPPORT FOR GEARING
Filed Feb. 16, 1950

INVENTOR
NELSON L. STALLSMITH
BY Toulmin & Toulmin
ATTORNEYS.

Patented Aug. 11, 1953

2,648,230

UNITED STATES PATENT OFFICE 2,648,230

ADJUSTABLE BEARING SUPPORT FOR GEARING

Nelson L. Stallsmith, Urbana, Ohio

Application February 16, 1950, Serial No. 144,444

4 Claims. (Cl. 74—396)

1

This invention relates to adjustable bearing supports, and particularly to an adjustable bearing support, for a steering gear for a tractor or the like, such that the gears can always be maintained free of undesirable lost motion.

In connection with the interconnecting of shafts by worm gears, particularly steering gears for vehicles such as tractors, it is desirable to maintain the gears in mesh with a predetermined minimum amount of lost motion or clearance therebetween. This is desirable in order to eliminate shock being transmitted between the shafts, and also to prevent undue wear or battering of the gears when the service to which they are being put is severe.

In connection with tractor steering gears, with which this invention is especially concerned, the shaft leading from the steering wheel of the tractor carries a worm and another shaft or column leading to the steerable wheels of the tractor mounts a worm wheel or sector meshing with the worm. Inasmuch as tractors are often driven over very rough ground, severe strains are imposed on the worm and sector, including vibratory loads, and it has been found that the said worm and sector have a tendency to wear and become loose after a period of use.

When the worm and sector become worn so that there is lost motion between them, driving the tractor becomes difficult and tiring, and it is quite hard to hold the tractor on an exact line, as is desirable at many times when plowing or cultivating adjacent a crop row.

Heretofore, after the worm and sector in a tractor steering arrangement of this nature became worn to the point of detracting from the driving qualities of the tractor, it was necessary to replace the worm and sector by new ones. A replacement job of this nature is not only expensive, but involves a great deal of work and consumes considerable time.

With the foregoing in mind, this invention has as its particular object an adjustable bearing support especially for tractor steering gears and the like, by means of which the worm and sector of the steering arrangement can be adjusted relatively to take up for lost motion.

A still further object of this invention is the provision of an adjustable bearing support by means of which a bearing and the element which it supports can be adjusted laterally of the axis of the bearing.

A still further object of this invention is the provision of an adjustable bearing support especially adapted for use with tractor steering gears which can readily be installed on a tractor without a major dismantling of the steering mechanism.

2

It is also an object to provide an adjustable bearing bracket of the nature described which is very simple and easy to adjust at any time that adjustment thereof becomes necessary.

This invention, then, particularly relates to an adjustable bearing bracket, especially for a tractor steering gear, which is easy to mount in position and easy to adjust, and operable to shift the worm and sector of the steering mechanism radially of the sector to maintain the lost motion therebetween at a predetermined minimum amount.

These and other objects and advantages will become more apparent upon reference to the following description taken in connection with the accompanying drawings, in which.

Figure 1:
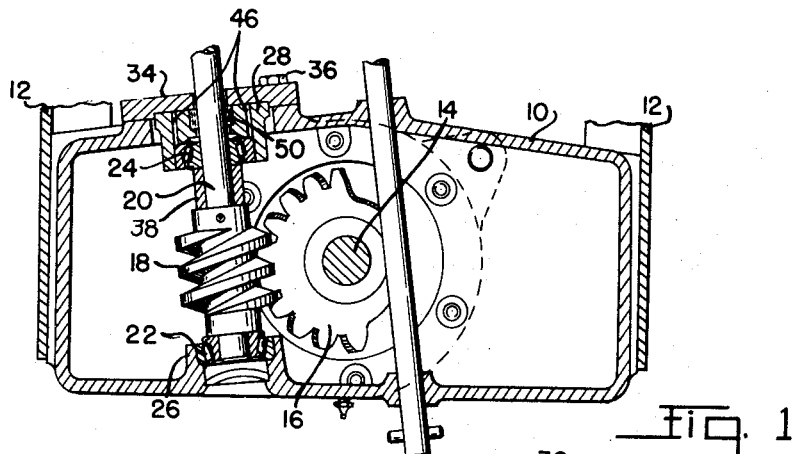
Figure 1 is a plan sector taken through a part of a tractor showing the steering gear arrangement therefor.

Referring to the drawings somewhat more in detail, Figure 1 shows the front portion of a tractor immediately above the steerable front wheels thereof, including a hollow frame part 10 which may be supported as by the channel members 12 forming a part of the tractor chassis.

Extending vertically through the frame is shaft or column 14 that is connected with the wheels of the tractor so movement of the shaft or column will turn the wheels. The shaft 14 mounts a worm wheel sector 16 that is in mesh with a worm 18 keyed to a shaft 20. Shaft 20 traverses frame 10 in a position offset from the axis of shaft 14 and extends to the steering wheel of the tractor, a suitable detachable coupling being included in the shaft for a purpose which will be explained hereinafter.

Shaft 20 is supported on anti-friction bearings 22 and 24. Bearing 22 is received in a suitably shaped bearing supporting boss 26 formed on one wall of frame 10, while bearing 24 is received in a member 28 forming a part of the adjustable bearing support according to this invention.

Figure 2:
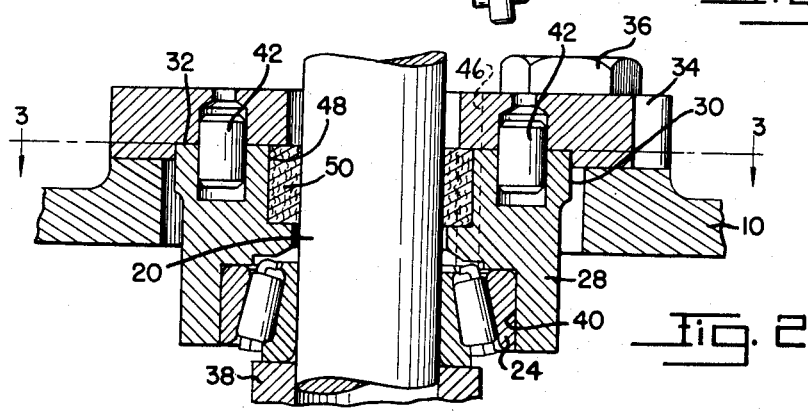
Figure 2 is a somewhat enlarged vertical section taken through the adjustable bearing support illustrated in Figure 1.
Figure 3:
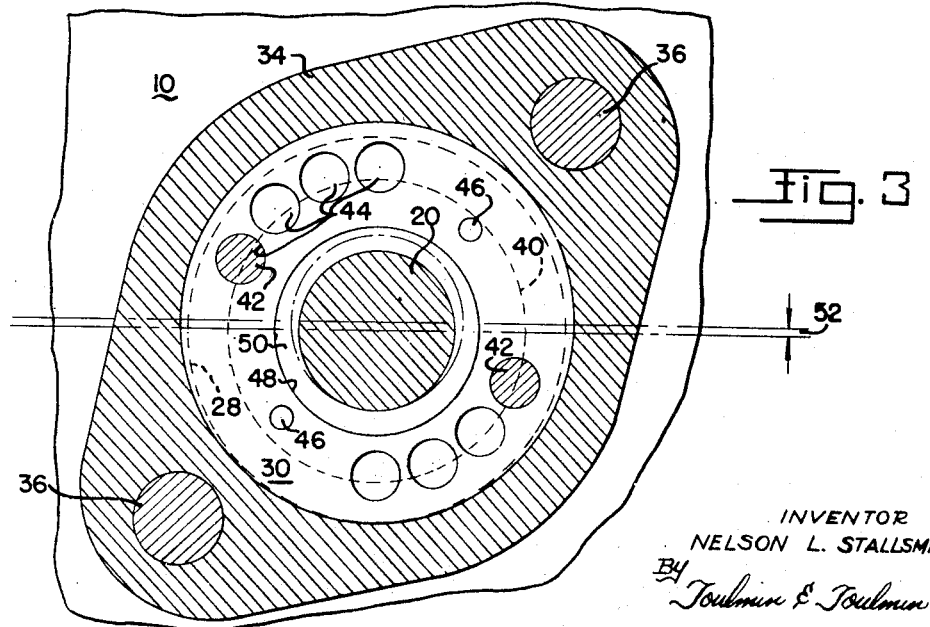
Figure 3 is a plan section through the adjustable support indicated by line 3—3 on Figure 2.

Turning now to Figures 2 and 3, it will be seen that member 28 is generally cylindrical, or at least has its end opposite bearing 24 turned to a cylindrical configuration, as indicated by reference numeral 30. Cylindrical part 30 of member 28 closely fits within cylindrical recess 32 of a flange 34 that is bolted to the wall of frame 10, as by cap screws 36. Cap screws 36 hold flange 34 rigidly in position on the frame and also hold member 28 and bearing 24 in proper position on shaft 20, as determined by spacer sleeve 38 positioned between the said bearing and the upper end surface of worm 18.

In Figure 3 it will be noted that the cavity or counterbore 40 which receives bearing 24 is eccentric relative to the cylindrical part 30 which is received in flange 34. The axes of cylindrical part 30 and counterbore 40 are parallel but laterally offset. For this reason angular adjustment of member 28 relative to flange 34 will adjust the position of the axis of bearing 24, and, therefore, of shaft 20, laterally, thereby to adjust the position of worm 18 radially of worm wheel sector 16.

In this manner wear of the worm and sector can be compensated for so that there is substantially no lost motion therebetween. This prevents wandering of the tractor as it is being driven, and also prevents the steerable wheels from swinging back and forth and causing a battering action between the worm and sector which would induce still more wear, and also prevents shocks being transmitted from the steerable wheels to the steering wheel.

According to this invention, member 28 and flange 34 are adapted for being secured together in a plurality of predetermined relative positions by means of a pair of circumferentially spaced dowel pins 42 which are press fitted in flange 34 on the circumference of a circle concentric with cylindrical recess 32. For receiving pins 42 member 28 has a plurality of drilled holes 44 which are circumferentially spaced on a circle concentric with cylindrical part 30 of the said member.

It will be evident that the construction of flange 34 and member 28 is such that they can be separated axially, then rotated relatively, and again brought together with the pins 42 in new locations, and that the said pins will maintain this orientation of the parts positively. It will also be evident that the dowel pins and holes shown and described are not the only means that can be employed for keying the flange and member together. Any suitable arrangement of interfitting parts which will permit the flange and member to be moved relatively angularly to a plurality of predetermined positions is considered to be the equivalent of the dowel pin and hole arrangement illustrated.

Inasmuch as it is to be preferred that the counterbore 40 be a close fit over the outer race of bearing 24, the member 28 is provided with knock-out holes as indicated at 46, and through which a knock-out member can be inserted to dislodge the bearing from the counterbore 40, if so desired.

In constructions presently employed in tractors of the type illustrated, flange 34 and member 28 are formed of one piece with the counterbore for receiving the bearing coaxial with the bolt circle on which the holes for cap screws 36 are formed.

Inasmuch as this flange closes the cavity in frame 10, it is necessary for it to include a seal member to prevent leakage of grease or oil. In the flange as heretofore constructed, the seal member has been placed in a counterbore in the outer surface of the flange and about the shaft so that it is in an exposed position. According to this invention, however, member 28 is provided with a counterbore in its upper surface coaxial with counterbore 40, as indicated at 48, for receiving the seal element 50 which surrounds shaft 20. This seal element is not only in a protected position, but is retained in place by flange plate 34 which overlies at least a part of the outer periphery of recess 48, and is also so positioned that it is always coaxial with shaft 20 in all positions of adjustment of member 28, and, therefore, is always in a position effectively to seal about the said shaft.

As previously mentioned, shaft 20 between frame 10 and the steering wheel of the arrangement includes a detachable coupling. This detachable coupling which is found in substantially all tractors for permitting the shaft 20 to traverse an angular path or to give the steering arrangement flexibility, is availed of to provide for the easy mounting of a bearing support according to this invention by disconnecting the coupling, removing the one-part flange as provided by the manufacturer, and replacing it by the two-part adjustable flange as illustrated and described.

Thereafter, the detachable coupling can be reconnected, and upon adjustment of the flange and the securing thereof in position, the tractor is again ready for use.

When it is desired to make an adjustment in the steering mechanism, as provided for by the adjustable flange of this invention, the cap screws 36 are removed, and the flange plate 34 is then moved up the shaft 20 away from member 28 far enough to dislodge dowel pins 42 from holes 44. The flange plate 34 is then turned clockwise on shaft 20 until dowel pins 42 line up with another pair of holes 44. The flange plate is then moved down into its position of telescopic engagement with member 28. The flange plate 34 is then availed of for turning the entire bearing support assembly in a counterclockwise direction until the holes in the flange plate through which the cap screws 36 are to pass again line up with the threaded holes in the frame 10 into which the said cap screws thread. Replacing of the said cap screws will again tighten the flange plate in position with the flange and the bearing support member in position, but with the shaft 20 and worm 18 adjusted radially inwardly of worm wheel sector 16 so as to take up lost motion therebetween.

By an arrangement such as described above the useful life of the worm and worm wheel sector are greatly increased, as well as the ease of driving the tractor. Under heavy service a worm and worm wheel sector of the type illustrated will commence to show a deterioration after about a year of use and should be replaced at the end of about two years. By the use of the adjustable support of this invention, the useful life of the worm and worm wheel sector can be extended to many times that amount, and the original gears should last the entire life of the tractor.

It will be evident that the adjusting of the shaft 20 in the manner described will move it to a different angular position than it occupied before adjustment. However, inasmuch as the total amount of adjustment contemplated is about .100 of an inch, it is believed that the usual bearing employed will automatically compensate for this slight change in angularity of the shaft 20.

As an illustration of the actual amount which the shaft 20 must be shifted to obtain the benefits of this invention, the total amount of adjustment which has been found necessary in one type of tractor arrangement is illustrated at 52 in Figure 3, and it will be evident that when this dimension is reduced in proportion of the scale of Figure 3 to Figure 1, about three to one, the actual change in angularity of shaft 20 will be very slight. However, should it be found that a greater adjustment than that indicated is necessary, and that this adjustment is of such an amount that the change in angularity in shaft 20 exceeds the allowable amount for the type of bearings illustrated at 22 and 24, a self-aligning type anti-friction bearing could readily be substituted.

These bearings have the frusto-conical rollers replaced by rollers more or less ellipsoidal in shape and have the races correspondingly formed so that angular movement between the inner and outer races can be had without detracting from the characteristics of the bearing.

It will also be evident that while the adjustment of this invention is applied to the upper bearing of Figure 1, it could be applied to the other bearing, or to both bearings, with suitable minor modifications in structure as would readily occur to anyone skilled in the art.

It will be understood that this invention is susceptible to modification in order to adapt it to different usages and conditions, and accordingly, it is desired to comprehend such modifications within this invention as may fall within the scope of the appended claims.

I claim:

1. In a tractor steering gear; a hollow frame, a column traversing said frame and having thereon a sector, a shaft traversing said frame in a position offset from said column and having a worm thereon in mesh with said section, an anti-friction bearing on said shaft on one side of said worm supported by the frame, another anti-friction bearing on the shaft on the opposite side of the worm, a generally cylindrical member about the shaft on the opposite side of said other bearing from said worm having an eccentric bore in one face thereof to receive the outer race of said other bearing, a flat flange about the shaft secured in a single fixed position to the outside of the frame adjacent said member and having a circular recess to closely receive the outer periphery of said member, whereby angular adjustment of said member in the recess will move the shaft and worm radially of said section, and means for locking said member and flange together in a plurality of angularly adjusted positions while permitting axial adjustment of the member relative to the flange.

2. In a tractor steering gear; a hollow frame, a column traversing said frame and having thereon a sector, a shaft traversing said frame in a position offset from said column and having a worm thereon in mesh with said section, an anti-friction on said shaft on one side of said worm supported by the frame, another anti-friction bearing on the shaft on the opposite side of the worm, a generally cylindrical member about the shaft having an eccentric bore in the face thereof that is toward the worm to receive the outer race of the said other bearing, a flat flange about the shaft secured in a single fixed position to the outer face of the frame adjacent said member and having a central bore to receive said shaft with a circular concentric counterbore on the inner face of the flange to receive the outer periphery of said member, whereby angular adjustment of said member in the recess will move the shaft and worm radially of said section, axially extending pin means in one of said member and flange, a plurality of axially extending pin means receiving recesses in the other thereof to provide for a plurality of positions of relative adjustment of said member and flange, a counterbore in the face of said member on the side toward said flange concentric with the bearing recess in the other face of the member and smaller than the bore in the flange that passes the shaft, a sealing means closely surrounding the shaft and confined in the counterbore by said flange, and a bore in the said member concentric with the said counterbore therein for receiving said shaft, the said bore in the flange being large enough to permit the said radial adjustment of said shaft.

3. As a new article of manufacture; an adjustable bearing support comprising, a flat flange adapted for being detachably fixed in a single position, a cylindrical recess in one face of the flange and a central bore through the flange concentric with the recess, a cylindrical member having one end closely fitting said recess so as to be angularly adjustable therein, and said member having an eccentric bore therethrough counterbored at its opposite ends, said member and flange having interfitting parts for locking them together in a plurality of different positions of angular adjustment, said interfitting parts including axial dowel pins in one of said member and flange and axial holes in the other thereof to receive said pins, the said counterbore in the end of the cylindrical element remote from the flange being adapted for receiving the outer race of an anti-friction bearing, and the counterbore in the end of the cylindrical element adjacent the flange being larger in diameter than the bore in the flange and being adapted for receiving a sealing element.

4. As a new article of manufacture; an adjustable bearing support comprising, a flat flange adapted for being fixed in position and having a central bore, a cylindrical recess in one face of the flange concentric with said bore, a cylindrical member having one end closely fitting said recess so as to be angularly adjustable and having an eccentric bore therein, and said member having a counterbore concentric with the said eccentric bore extending axially into the other end thereof to receive a bearing, said member also having another counterbore in its said one end adjacent the flange coaxial with the other counterbore for receiving a seal element, said other counterbore being larger than the said central bore in the flange, said member and flange having interfitting parts for locking them together in a plurality of different positions of angular adjustment, said interfitting parts permitting axial adjustment of the member on the flange while maintaining the angular adjustment thereof.

NELSON L. STALLSMITH.

References Cited in the file of this patent

UNITED STATES PATENTS

| Number | Name | Date |
|---|---|---|
| 1,815,450 | Schmal | July 21, 1931 |
| 2,068,679 | Hokansson | Jan. 26, 1937 |
| 2,107,214 | Rechtin et al. | Feb. 1, 1938 |
| 2,192,483 | Augustine et al. | Mar. 5, 1940 |
| 2,542,388 | Brodhead | Feb. 20, 1951 |

FOREIGN PATENTS

| Number | Country | Date |
|---|---|---|
| 473,053 | France | Dec. 3, 1914 |